United States Patent
Nakakoshi et al.

[15] 3,635,624
[45] Jan. 18, 1972

[54] BLOW-MOLDING APPARATUS

[72] Inventors: Yoshio Nakakoshi, No. 9-1, 5-chome, Minamiaoyama, Minato-ku, Tokyo; Senkichi Nakakoshi, No. 1-7-403, 1-chome, Sakurajosvi, Setagaya-ku, Tokyo, both of Japan

[22] Filed: Aug. 29, 1969

[21] Appl. No.: 854,065

[30]     Foreign Application Priority Data

Oct. 22, 1968   Japan...................43/76527

[52] U.S. Cl.............................425/133, 264/127, 425/378
[51] Int. Cl..................................................B29c 5/08
[58] Field of Search...................18/13 P, 12 DM, 14 H, 14 P, 18/15 BE, 5 BF, 5 BH, 5 BM; 264/127

[56]     References Cited

UNITED STATES PATENTS

| | | |
|---|---|---|
| 2,617,151 | 11/1952 | Rubin...................264/127 |
| 3,023,461 | 3/1962 | Sherman..................18/14 P |
| 3,184,358 | 5/1965 | Utz.......................18/14 P |
| 3,196,592 | 7/1965 | Cheney..................18/5 BF |

*Primary Examiner*—Robert L. Spicer, Jr.
*Attorney*—Kane, Dalsimer, Kane, Sullivan & Kuracy

[57]     ABSTRACT

A blow-molding apparatus involving a die, an annular port for delivering material formed in the lower portion of said die, a first annular feeding passage formed in said annular port at the inside, a second annular feeding passage formed in said die in a manner to communicate with said annular port at the outside, a heat-resistant barrier coaxially disposed between said feeding passages, and means for full heating of the material in the respective feeding passages. The synthetic resinous material in the feeding passages are of various or different kinds.

3 Claims, 2 Drawing Figures

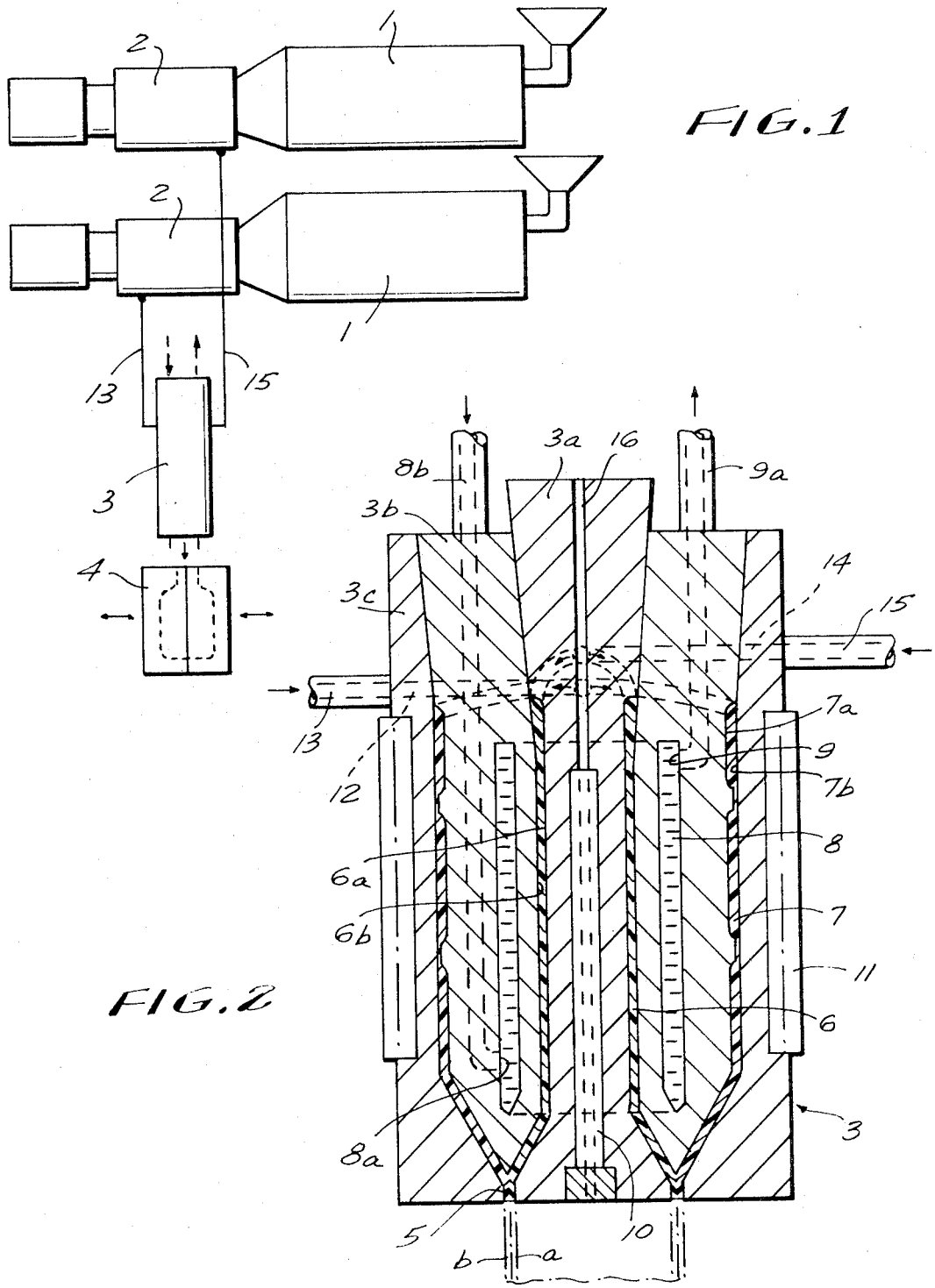

BLOW-MOLDING APPARATUS

BACKGROUND OF THE INVENTION

This invention relates to a blow-molding apparatus and more particularly to a blow-molding apparatus having a feeding head or die adapted to form hollow articles having more than two superposed layers which are made of synthetic resins of different kinds.

The prior art apparatus cannot form a hollow article of large bulk, diameter or thickness having a single layer where the article is made of materials such as polycarbonate, because such material is unavoidably liable to draw downwardly by its weight.

SUMMARY OF THE INVENTION

An object of this invention is to provide a blow-molding apparatus improved to downwardly deliver from a die a parison consisting of more than two superposed layers tightly adhered to each other which are made of synthetic resins of separate kinds, so that said parison is prevented from drawing downwardly due to a supporting effect of at least one of the layers against the other.

In this case, said supporting layer must be made of a synthetic resin having strength to endure drawing downwardly, such as polyethylene.

This invention will be understood from the following description with reference to the accompanying drawing.

BRIEF EXPLANATION OF THE DRAWING

FIG. 1 is a diagrammatical side view of a blow-molding apparatus embodying this invention; and FIG. 2 is a vertically sectional view of a die of said blow-molding apparatus.

DETAILED DESCRIPTION OF AN EMBODIMENT

FIG. 1 indicates a blow-molding apparatus which involves two extrusion machines or extruders 1 each having a screw (not shown) for mixing a synthetic resinous material, two accumulators 2 associated with said extrusion machines 1, respectively, a die 3 and a split mold 4.

As shown in FIG. 2, said blow-molding apparatus particularly involves an annular port 5 for delivering the synthetic resin formed in the lower portion of said die 3 in a manner to open at the lower surface of said die 3, a first annular feeding passage 6 formed in said die in a manner to position coaxially to said annular port 5 and communicate with said annular port 5 at the inside portion, and a second annular feeding passage 7 formed in said die in a manner to position coaxially to said annular port 5 and said first feeding passage 6, and to communicate with said annular port 5 at the outside portion.

Said blow-molding apparatus further involves a heat-resistant barrier 8 which consists of a cooling passage surrounding the first annular feeding passage 6 with a space and positioned between both feeding passages 6 and 7. Said cooling passage is preferably formed in said die; and in which is adapted to flow a liquid coolant such as polyethylene glycol. Furthermore, such cooling passage is preferably formed in a closed annular cylinder and is provided with an inlet port 8a communicating with an inlet tube 8b and an outlet port 9 communicating with an outlet tube 9a. Said inlet and outlet tubes 8a and 9a circularly communicate with a heat exchanger (not shown) through suitable pumping means. Positioned at the center portion of said die 3 is a heater 10 for heating the synthetic resinous material full in the first feeding passage 6. Another heater 11 is disposed at the outer periphery of said die 3 so as to heat the resinous material fully in the second feeding passage 7. Said heaters 10 and 11 preferably consist of electric heating elements. Said die 3 may be assembled by first, second and third blocks 3a, 3b, and 3c coaxially fitted with each other. Moreover, the first feeding passage 6 may be defined by a small diameter portion 6a formed in the outer surface of the first block 3a and the inner surface 6b of the second block 3b, and the second feeding passage 7 may be defined by a small diameter portion 7a in the outer surface of the second block 3b and an inner surface 7b of the third block 3c.

A passage 12 is formed in die 3, i.e., the second block 3b and communicates with the second passage 7 and a feed tube 13 through the third block 3c. A passage 14 is formed in die 3, i.e., the first and second blocks 3a and 3b, and communicates with the first passage 6 and a feed tube 15 through the third block 3c. Said feed tubes 13 and 15 respectively associate with the above-mentioned respective accumulators 2. Indicated at 16 is an air passage for blowing and which is opened at the lower end of the die 3.

In this case, the synthetic resinous material supplied to the first passage 6 may be exemplified as a polycarbonate, and one of the second passage 7 as a polyethylene or polypropylene.

In operation, the respective heaters 10 and 11 are actuated so as to maintain the polycarbonate in the first passage 6 about 220° C. and the polyethylene or polypropylene about 180° C. In this state, the coolant supplied to the cooling passage acts so as to prevent the transmission of heat from the first passage 6 to the second passage 7 via the body of the die 3.

At the delivery port 5, the inner layer a of polycarbonate tightly contact the outer layer b of polyethylene or polypropylene, so that the former layer is supported by the strength of the latter layer against drawing downwardly. While the parison is in turn lowered, the heat is transmitted from the inner layer to the outer layer so as quickly to lower the temperature of the former layer, with the result that the tendency of the polycarbonate to draw down is further sufficiently eliminated.

Although the embodiment is described in a pattern that a layer acts to support another layer tightly contacted therewith, it can be adapted in a pattern that both layers act to mutually assist each other, if the kinds of the materials are desirably selected.

Furthermore, the embodiment is described in a type of the device which produces hollow articles having superposed double layers. However, this invention includes a separate type of the blow-molding apparatus for producing hollow articles having more than two superposed layers which are made of the synthetic resinous materials of separate types. In this case, a plurality of feeding passages must be provided in corresponding relation with the number of said layers, and the heat-resistant barriers are disposed among the passages.

What is claimed is:

1. A blow-molding apparatus comprising a die, adapted to form hollow articles having at least two superimposed and adhered layers of different synthetic resins, said die having a lower portion, an annular port means for downwardly delivering a parison of the two superimposed and adhered layers of different synthetic resins, a plurality of feeding passages formed in said die and being in communication with said annular port, supply means for supplying the different synthetic resins to the respective feeding passages, heating means for heating the resins in the respective feeding passages to different temperatures, and a heat-resistant barrier means disposed between the feeding passages to cooperate in maintaining the different temperatures independent of one another, the barrier means including a cooling passage in the die through which a coolant is adapted to flow, said cooling passage including an inlet port and an outlet port to permit introduction and removal of the coolant from the die.

2. A blow-molding apparatus claimed in claim 1 in which the annular port has an inside and outside portion and in which the feeding passages consist of first and second annular passages, the former passage communicating with the annular port at the inside, and the latter passage with annular port at the outside.

3. A blow-molding apparatus claimed in claim 2 in which the die consists of first, second and third blocks, the first and second blocks defining the first feeding passage, and the second and third blocks defining the second feeding passage.